United States Patent [19]

Yonemitsu et al.

[11] 3,970,640

[45] July 20, 1976

[54] PROCESS FOR THE PRODUCTION OF POLYPHENYLENE ETHERS HAVING A DESIRED POLYMERIZATION DEGREE

[75] Inventors: Eiichi Yonemitsu, Kashiwa; Akitoshi Sugio, Tokyo; Takao Kawaki, Tokyo; Akihiko Konishi, Tokyo; Zempei Mizutani, Tokyo, all of Japan

[73] Assignee: Mitsubishi Gas Chemical Company, Inc., Tokyo, Japan

[22] Filed: June 26, 1974

[21] Appl. No.: 483,329

[30] Foreign Application Priority Data

June 26, 1973 Japan.............................. 48-72084

[52] U.S. Cl. .......................................... 260/47 ET
[51] Int. Cl.$^2$........................................ C08G 63/62
[58] Field of Search ............................. 260/47 ET

[56] References Cited
UNITED STATES PATENTS

| | | |
|---|---|---|
| 3,134,753 | 5/1964 | Kwiatek.......................... 260/47 ET |
| 3,337,501 | 8/1967 | Bussink et al.................... 260/47 ET |
| 3,573,257 | 3/1971 | Nakashio et al................. 260/47 ET |
| 3,630,995 | 12/1971 | Modan............................ 260/47 ET |
| 3,838,102 | 9/1974 | Bennett et al. ................. 260/47 ET |

*Primary Examiner*—Lucille M. Phynes
*Attorney, Agent, or Firm*—Sughrue, Rothwell, Mion, Zinn & Macpeak

[57] ABSTRACT

Polyphenylene ethers, self-condensation products of phenols, having desired polymerization degree are prepared by a process which comprises terminating the reaction by adding simultaneously at least one member selected from the class consisting of dioxybenzenes and/or benzoquinones and a reducing agent to the reaction medium at the stage of the desired polymerization degree in the oxidative polycondensation of phenols in the presence of a complex catalyst.

9 Claims, No Drawings

PROCESS FOR THE PRODUCTION OF POLYPHENYLENE ETHERS HAVING A DESIRED POLYMERIZATION DEGREE

DETAILED DESCRIPTION OF THE INVENTION

This invention relates to a process for the production of polyphenylene ethers by oxidative polycondensation of phenols and more particularly it relates to a process, for the production of polyphenylene ethers by reacting a substituted-phenol with oxygen in the presence of a complex-catalyst containing copper compound, manganese compound or cobalt compound, which comprises terminating the oxidative polycondensation at a stage of any desired polymerization-degree to obtain a polymer having a desired molecular weight. The polymers obtained by the said process are remarkably stabilized at the stage of the termination of the reaction.

Heretofore many processes have been proposed for the production of polyphenylene ethers by oxidative polycondensation of phenols, for example as a typical process, phenols are reacted with oxygen in the presence of a catalyst composed of copper compound, manganese compound or cobalt compound as well as a primary, secondary or tertiary monoamine or diamine as ligand, if desired together with alcohols or alcoholates. Phenols used in the process said above are represented by the general formula (I)

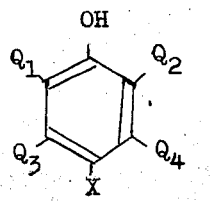

wherein X is a substituent selected from the class consisting of hydrogen, chlorine, bromine and iodine;

$Q_1$ is a monovalent substituent selected from the class consisting of hydrogen, alkyl, haloalkyl having at least two carbon atoms between halogen and phenyl nucleus, alkoxy, and haloalkoxy having at least two carbon atoms between halogen and phenyl nucleus, $Q_2$, $Q_3$ and $Q_4$ are the substituent same with $Q_1$ or represent halogen, wherein $Q_1$, $Q_2$, $Q_3$ and $Q_4$ do not include the substituents in which the alpha-carbon atom being tertiary; and the polymer thereby obtained has repeating units represented by the formula (II)

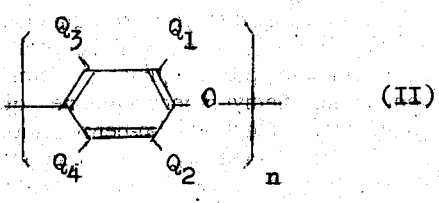

wherein $Q_1$, $Q_2$, $Q_3$ and $Q_4$ are as defined above, and n is an integer of at least 100. In the process of the polymerization, one of the most useful techniques is to regulate the reaction at a desired polymerization degree. The process said above is variously deviced according to the art of the polymerization such as, for example, mercaptans are used as regulator of chain transfer in the free radical polymerization of styrene and t-butyl phenol is commonly added as terminator in the production of polycarbonate in solution polymerization at the start or end of the polymerization and the amounts thereof to be added are regulated to effect a desired polymerization degree. As to the process for the production of polyphenylene ethers by known oxidative polycondensation of phenols, there has been proposed various methods for obtaining polyphenylene ethers having desired polymerization degree by suitably terminating the oxidative polycondensation reaction.

There is disclosed a method, for example, in U.S. Pat. Nos. 3,306,874 and 3,306,875 in which the reaction is terminated by decomposing a complex catalyst by adding a mineral acid such as hydrochloric acid, sulfuric acid, organic acid such as acetic acid or a base such as calcium, sodium or potassium hydroxide to a reaction solution. Acids so said above, however, do not always act as inactivating of every catalyst-system. According to the combination of the catalyst-system there may sometimes remain the activity of the catalyst after the addition of the acid to cause prolonged polymerization. And also the addition of acid such as mineral acids causes ultimately the remaining of the acid in the polymer and even if in a trace amount thereof it is injurious for the natures of the polymer and will deteriorate the quality of the product. For the removal of such acids substantially from the polymer there requires a troublesome washing process. Addition of bases can not be expected the complete termination of the polymerization reaction and especially in an elevated temperature it results either remaining of prolonged polymerization or depolymerization.

As another method, there has been practised a method for terminating the reaction in a desired stage by precipitating the polymer by pouring the oxidative polycondensation solution into a non-solvent for the polymer. By this method, however, though the polymerization has been completely terminated, remaining of the catalyst in the precipitated polymer can not be avoided and then the polymer obtained is coloured and the quality thereof deteriorates remarkably. This process is in fact not practical for the industrial production.

The present inventors have been engaged in the study of the production of the polyphenylene ethers having desired polymerization degree by terminating the oxidative polycondensation reaction at any desired polymerization degree in the process of the production of polyphenylene ethers by oxidative olycondensation of phenols and the present invention has been accomplished by the finding of an excellent method for the termination of the reaction by which disadvantages mentioned above can be all avoided.

After having particularly investigated the behavior of the polymer at the close of the reaction for the purpose of obtaining a complete termination at any stage of a desired polymerization degree, the present inventors have confirmed that the polycondensation relating to the preparation of the polyphenylene ethers proceeds in a system accompanied with a zipper-depolymerization reaction of the polymer, beginning from the terminal thereof, and/or a crosslinking reaction originated in the formation of active methylene groups caused by abstraction of hydrogen on α-carbon atom of the side chain of the polymer in addition to the normal polycondensation reaction. It was also recognized that according to the behavior of active radicals presented said side-reactions will still further proceed merely by the deactivation of the catalyst.

The present invention has been accomplished grounding on the findings as mentioned above and it consists in the simultaneous addition of a specified amount of at least one member selected from the class consisting of dioxybenzens and benzoquinones and a specified amount of at least one reducing agent hereinafter described to the reaction medium at an optional stage desired to terminate the reaction in the oxidative polycondensation of phenols. By the treatment as mentioned above the normal polycondensation reaction as well as said various side-reactions can be completely blocked. The polymers obtained by said treatments are sufficiently stabilized as exemplified by the facts that in the polymerization-solution obtained by terminating the polymerization-reaction according to the present invention there is not seen any reactions of depolymerization, crosslinking and normal polymerization even in the slightest degree when the polymerization solution is heated at 100°C for 24 hours and that any changes in the intrinsic viscosities as well as distributions of molecular weight of the polymer between before and after the heat treatment of said solution can not be observed.

As shown in these facts as mentioned above, quite unexpected outstanding effects can be attained by the present invention and bring various advantages in the process for the production of polyphenylene ethers.

Firstly, an object of this invention consists in terminating the reaction exactly and completely at any desired polymerization degree in the oxidative polycondensation of phenols.

Another object of this invention consists in producing polyphenylene ethers having defined narrow molecular weight distribution quite easily and constantly by controlling to say nothing of the normal polycondensation and also secondary (side) reactions. This advantage acts quite effectively on the quality control in the production of polyphenylene ethers.

Still another object of this invention consists in obtaining a purified polymer which has improved whiteness and has not been contaminated by catalysts and/or other reagents.

The other object of this invention resides in isolating the obtained polymer by simplified steps, that is, by distilling out the solvent from the reaction-solution and then by separating the polymer from the catalyst in the concentrated reaction solution with extraction or precipitation treatment. By accomplishing these objects the present invention provides a reasonable process for the production of polyphenylene ethers.

The process according to the invention consists, as mentioned above, in the simultaneous addition of at least one member selected from the class consisting of dioxybenzenes and benzoquinones and at least one reducing agent hereinafter described to the polymerization medium. When at least one of dioxybenzenes and/or benzoquinones is used solely even if the reaction is terminated according to the catalyst system thereby selected, the polymer produced is coloured from yellow to yellowish brown and on the other hand when the reducing agent is used solely, no effect can be obtained. After all, the combination of said dioxybenzenes and/or benzoquinones with the reducing agent can only attain the complete termination-reaction as an object of this invention and attribute the improvement of the quality of the polymer.

Dioxybenzenes and benzoquinones used in the present invention are represented by the formulae III and IV or V

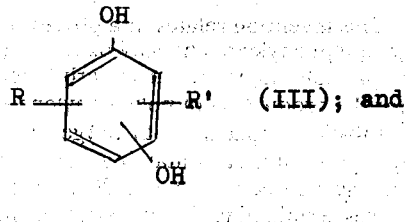

wherein R and R' each represents a hydrogen atom or alkyl or alkoxy substituents having at most four carbon atoms.

Suitable corresponding compounds include hydroquinone, resorcin, catechol, methyl hydroquinone, propyl hydroquinone, butyl hydroquinone, methyl resorcin, ethyl resorcin, propyl resorcin, butyl resorcin, methyl catechol, ethyl catechol, propyl catechol, butyl catechol, dimethyl hydroquinone, methyl ethyl hydroquinone, diethyl hydroquinone, dimethyl resorcin, methyl ethyl resorcin, diethyl resorcin, dimethyl catechol, methyl ethyl catechol, diethyl catechol, methoxy hydroquinone, methyl methoxy hydroquinone, dimethoxy hydroquinone, methoxy resorcin, methyl methoxy resorcin, dimethoxy resorcin, methoxy catechol, methyl methoxy catechol, dimethoxy catechol, p-benzoquinone, methyl-p-benzoquinone, ethyl-p-benzoquinone, propyl-p-benzoquinone, butyl-p-benzoquinone, o-benzoquinone, methyl-o-benzoquinone, ethyl-o-benzoquinone, propyl-o-benzoquinone, butyl-o-benzoquinone, dimethyl-p-benzoquinone, methyl ethyl-p-benzoquinone, diethyl-p-benzoquinone, dimethyl-o-benzoquinone, methyl ethyl-o-benzoquinone, diethyl-o-benzoquinone, methoxy-p-benzoquinone, methyl methoxy-p-benzoquinone, dimethoxy-p-benzoquinone, methoxy-o-benzoquinone, methyl methoxy-o-benzoquinone, dimethoxy-o-benzoquinone and the like. Particularly preferred are dioxybenzenes represented by hydroquinone, catechol and nuclear-substituted derivatives thereof.

The reducing agents to be combined with these dioxybenzenes and/or benzoquinones include principally whatever only if it may perform a reduction in such a wide sense as is capable of giving electrons to a substance. For example, the object of the present invention can also be attained by reacting with hydrogen under the presence of a hydrogenation catalyst. But the reducing agents having strong reducing power sometimes separate metals by reducing the metalic compounds composing of the oxidative polycondensation catalyst of phenols and these metals sediment as micro powders or deposite on the wall of the reaction vessel to require filtration or removal thereof which makes the operation troublesome. Accordingly, as for the reducing agent used in the present invention, it is desirable to use a reducing agent which will not reduce the oxidative polycondensation catalyst of phenols so far to a metal even if dioxybenzenes and/or benzoquinones are used simultaneously. These are exemplified with sulfur suboxides such as sulfur dioxide or sulfurous acid; salts of hydrogen sulfide and salts thereof such as ammonium sulfide or sodium sulfide; salts of lower oxyacid such as sodium sulfite, sodium bisulfite or sodium dithionite; salts containing metal in lower valency of higher oxyacid or hydroacid such as stannous chloride, ferrous sulfate, chromous chloride or titanous chloride; and reducing compounds containing nitrogen such as hydroxylamines and their salts, or hydrazine and substituted derivatives thereof and their salts.

At least one member of dioxybenzenes and benzoquinones to be added in the present process may be used in an amount of more than two moles based on a mole of the catalyst in the oxidative polycondensation of phenols, however, it is of no use to add a larger amount more than required amount, and thereby, dioxybenzenes and/or benzoquinones may usually be selected in an amount ranging between 2.2 and 10 times, preferably 5 times, of the mole of the catalyst. The amount of the reducing agent to be added is, in the same manner, suitably selected in a range more than 3 moles based on a mole of the catalyst, usually in a range between 3 and 10 times. These compounds may be added in a form of solution employing water, alcohols or other solvents, and these may be added to the reaction system as they are.

The time to terminate the oxidative polycondensation of phenols as an object of the present invention, in other words the time of the addition of the terminator consisting of the reducing agent and dioxybenzenes and/or benzoquinones may be suitably selected according to the desired polymerization degree of polyphenylene ether and it is generally selected in a period until side-reactions of the depolymerization and/or cross-linking take place together with the normal polycondensation reaction by the end of the said reaction, even though it is especially not to be restricted therein.

As for a catalyst of the oxidative polycondensation reaction for the present process, it may be used whatever only if thereby employed a complex compound containing a copper, manganese or cobalt salt, i.e. a complex compound composed of a copper, manganese or cobalt salt as well as a primary, secondary or tertiary mono- or diamine (including aliphatic or aromatic nitrogen containing compounds) as ligand. Besides the reaction system in which these complex compounds are used as main catalyst, a reaction system in which for example complex compounds as said above or the other complex compounds containing copper, manganese or cobalt are used as promotor or co-catalyst, may be included in the scope of the present invention so long as the salt of said metal will be effectively used. Though phenols employed in these processes may be such compounds as represented by the formulae (I) as mentioned above, preferably 2,6-disubstituted phenols, especially 2,6-dialkyl phenols are used for the present invention.

The present invention is further explained by the examples as mentioned below. In the examples and comparative examples "parts" and "percent" are based on weight, unless otherwise stated.

Comparative Example 1

250 parts of 2,6-xylenol is dissolved into 2500 parts of toluene and the solution is added with 1.35 parts of cuprous iodide dissolved in 180 parts of n-butyl amine and air is then introduced therein under stirring. The temperature is maintained at 40°C. After 90 minutes the blowing of air and stirring are stopped and immediately 100 parts aliquots of the reaction solution are placed into each Erlenmeyer's flask and each flask is added with a variety of additive as shown in Table I respectively and is thoroughly mixed with shaking and then allowed to stand. Small portions of the reaction solution are taken out periodically and are added with methanol to result the precipitation of the polymer and the intrinsic viscosity of the polymer is measured (at 25°C in chloroform). As it can be seen in Table I under these treatments the polymerization is not completely stopped and whether proceeds polymerization or cross-linking or takes place depolymerization.

Table I

| Example | Additive | Additive Catalyst (mol ratio) | Water*[-2)] added (ml) | Temperature of left standing (°C) | Change of intrinsic viscosity (dl/g) with elapse of the time (hours) | | | |
|---|---|---|---|---|---|---|---|---|
| | | | | | 0 | 2 | 5 | 24 |
| 1 | not added | — | — | 25 | 0.60 | 0.57 | 0.45 | 0.40 |
| 2 | " | — | — | 45 | 0.59 | 0.65 | 0.73 | gelation |
| 3 | 70%-sulfuric acid*[-1)] | 1.05 | — | 30 | 0.59 | — | 0.50 | 0.48 |
| 4 | 20%-nitric acid*[-1)] | 1.0 | — | 40 | 0.60 | 0.49 | 0.46 | — |
| 5 | 48%-sodium hydroxide*[-1)] | 25 | — | 40 | 0.61 | 0.54 | 0.51 | 0.42 |
| 6 | Hydrazine | 10 | 40 | 40 | 0.61 | 0.46 | 0.50 | 0.66 |
| 7 | " | 30 | 40 | 40 | 0.61 | 0.44 | 0.45 | 0.44 |
| 8 | Hydroxylamine-HCl*[-3)] | 20 | — | 40 | 0.60 | 0.47 | 0.45 | 0.45 |
| 9 | Catechol | 5 | 30 | 40 | 0.61 | 0.57 | 0.56 | 0.54 |
| 10 | t-Butyl catechol | 5 | 30 | 40 | 0.61 | 0.55 | 0.58 | 0.63 |

*[-1)] Each one is an aqueous solution.
*[-2)] The amount of water added to a 100 parts aliquot of the reaction mixture together with the additive.
*[-3)] This compound is used as a 1.57% aqueous solution.

Examples 1 – 24 and Comparative Example 2

In these Examples the same oxidative polycondensation of 2,6-xylenol as described in Comparative Example 1 is repeated in the same dosage and operation by using the same cuprous iodide-n-butylamine complex catalyst as these of said Comparative Example and immediately after the completion of the reaction the obtained solution containing polyphenylene ether in toluene is divided into each 100 parts of portions and everyone of these portions are added with a terminating agent of various kinds composed according to the invention respectively and then allowed to stand.

As it can be seen from Table II, no change is observed with respect to the intrinsic viscosity of each polymer obtained after left standing at the temperature allowed as it is.

weight of the polymers obtained by every elapse of the time are measured and the results are shown in Table III. As same as intrinsic viscosity also no change is shown with the elapse of time. The results in which reaction-terminating agent is not used are also shown in Table III as Comparative Example 2.

Table III

|  | Temperature for left standing | | Change of molecular weight with the elapse of the time (hours) | | | |
| --- | --- | --- | --- | --- | --- | --- |
|  |  |  | 0 | 2 | 5 | 24 |
| Example 2 | 80°C | $\overline{M}_n$ | 17600 | 17400 | 17000 | 17700 |
|  |  | $\overline{M}_w$ | 41600 | 41100 | 40800 | 41100 |
|  |  | $\overline{M}_w/\overline{M}_n$ | 2.4 | 2.4 | 2.4 | 2.3 |
| Comparative Example 2 | 80°C | $\overline{M}_n$ | 17600 | 15200 |  |  |
|  |  | $\overline{M}_w$ | 41600 | 46300 | Gelation | — |
|  |  | $\overline{M}_w/\overline{M}_n$ | 2.4 | 3.05 |  |  |

Example 25

In this Example oxidative polycondensation of 2,6-xylenol is carried out and the stirring and air-introduction are stopped at the time when the polymer having 0.55 dl/g of intrinsic viscosity is furnished and immediately the reaction-liquor is divided into four parts and each added with combined terminating agent in an Table II

| Example | Combined terminating agent Reducing agent (second line) | Additive Catalyst (molar ratio) | Water added (ml) | Temperature for left standing (°C) | Change of intrinsic viscosity (dl/g) with elapse of the time (hours) | | | |
| --- | --- | --- | --- | --- | --- | --- | --- | --- |
|  |  |  |  |  | 0 | 2 | 5 | 24 |
| 1 | Catechol<br>Sodium sulfite | 2<br>5 | 10 | 40 | 0.63 | 0.63 | 0.63 | 0.63 |
| 2 | ''<br> | 3<br>10 | 10 | 80 | 0.61 | 0.61 | 0.60 | 0.61 |
| 3 | ''<br> | 3<br>10 | 10 | 100 | 0.60 | 0.60 | 0.60 | 0.61 |
| 4 | ''<br> | 3<br>5 | — | 40 | 0.60 | 0.61 | 0.60 | 0.60 |
| 5 | Catechol<br>Hydroxylamine-HCl | 3<br>10 | 10 | 40 | 0.59 | 0.58 | 0.58 | 0.58 |
| 6 | Catechol<br>Phenylhydrazine | 3<br>10 | — | 40 | 0.58 | 0.58 | 0.57 | 0.58 |
| 7 | Catechol<br>Hydrazine | 3<br>10 | — | 40 | 0.59 | 0.58 | 0.59 | 0.59 |
| 8 | Catechol<br>Sulfurous acid anhydride in methanol | 3<br>10 | — | 40 | 0.57 | 0.57 | 0.56 | 0.575 |
| 9 | Catechol<br>Stannous chloride | 3<br>10 | 10 | 40 | 0.59 | 0.57 | 0.56 | 0.56 |
| 10 | Catechol<br>Ferrous chloride | 3<br>10 | 10 | 40 | 0.59 | 0.56 | 0.56 | 0.56 |
| 11 | Catechol<br>Sodium dithionite | 3<br>3 | — | 40 | 0.60 | 0.59 | 0.59 | 0.59 |
| 12 | Hydroquinone<br>Hydroxylamine | 3<br>10 | 10 | 40 | 0.55 | 0.54 | 0.54 | 0.54 |
| 13 | Resorcin<br>Sodium sulfite | 3<br>20 | 10 | 40 | 0.56 | 0.55 | — | — |
| 14 | 4-t-butyl catechol<br>Sodium sulfite | 5<br>10 | 10 | 40 | 0.57 | 0.58 | 0.57 | 0.57 |
| 15 | Benzoquinone<br>Sodium sulfite | 5<br>10 | 10 | 40 | 0.50 | 0.46 | 0.48 | 0.48 |
| 16 | Benzoquinone<br>Ammonium sulfide | 3<br>10 | 10 | 40 | 0.53 | 0.53 | 0.53 | 0.525 |
| 17 | 4-methyl-catechol<br>Sodium sulfite | 3<br>10 | 10 | 40 | 0.54 | 0.54 | 0.53 | 0.54 |
| 18 | 2-t-Butylhydroquinone<br>Hydroxylamine | 3<br>10 | 10 | 40 | 0.50 | 0.49 | 0.49 | 0.49 |
| 19 | 4-Methoxy catechol<br>Sodium sulfite | 4<br>5 | 10 | 40 | 0.55 | 0.55 | 0.55 | 0.54 |
| 20 | o-Benzoquinone<br>Hydrazine | 3<br>10 | 10 | 40 | 0.55 | 0.55 | 0.55 | 0.55 |
| 21 | 2-Methylbenzoquinone<br>Sodium sulfite | 4<br>10 | 10 | 40 | 0.55 | 0.54 | 0.54 | 0.54 |
| 22 | 2-Ethoxybenzoquinone<br>Hydroxylamine | 4<br>10 | 10 | 40 | 0.55 | 0.55 | 0.54 | 0.54 |
| 23 | Catechol<br>Hydrogen sulfide aqueous solution | 3<br>10 | — | 40 | 0.53 | 0.53 | 0.54 | 0.53 |
| 24 | Hydroquinone<br>Sodium bisulfite | 4<br>10 | 10 | 40 | 0.55 | 0.55 | 0.54 | 0.54 |

In Example 2 described in Table II weight-average molecular weight and number-average molecular amount corresponding to 3 moles of catechol and 10 moles of sodium sulfite per mole of the catalyst respectively and then allowed to stand for 10 hours. The polymer is separated from the liquor thus treated and the whiteness of the polymer is measured in the manner according to Hunter's method. Whiteness of the polymer is measured with Colour-Studio, CSK Type-6B (produced by Nihon Denshoku Kogyo, Co.) by employing chloroform as reference solution and the sample solution in the concentration of the polymer 1 g/chloroform 20 ml. The results are shown in Table IV and also there is shown a result wherein no terminating agent is added.

Table IV

|  | Temperature for left standing (°C) | Coloured degree | |
| --- | --- | --- | --- |
|  |  | Transparency (%) | Whiteness (%) |
| Example | 40 | 95.0 | 79.5 |
|  | 60 | 95.4 | 80.5 |
|  | 80 | 94.0 | 78.0 |
| Comparative Example | 40 | 86.0 | 67.0 |

Example 26

To a four necked flask fitted with a thermometer, a reflux condenser, a stirrer and a gas inlet tube are placed 60 parts of xylene, 20 parts of pyridine and 0.42 part of manganese-(II)-chloride and then oxygen is introduced therein under stirring at 50°C. Then the reaction mixture is added with 4.0 parts of 2,6-xylenol and reacted under the introduction of oxygen for 6 hours. Then the introduction of oxygen is stopped and the reaction mixture is added with a previously prepared aqueous solution containing 0.2 part of catechol and 0.5 part of sodium sulfite and after stirring for 5 minutes allowed to stand. Also the same reaction is carried out without addition of catechol and sodium sulfite. The intrinsic viscosities of these polymers in the respective reaction-solutions are compared.

[η] dl/g (at 25°C in chloroform) of these two were 0.6 at immediately after left for standing, however, the intrinsic viscosity after allowed to stand for ten hours shows no substantial change such as 0.59 in the case treated with catechol-sodium sulfite, whereas it is reduced to 0.51 in the case in which such treatment is omitted.

Example 27

To a four necked flask fitted with a thermometer, a reflux condenser, a stirrer and a gas-inlet tube are placed 100 parts of benzene, 1.3 parts of tetraethylene diamine, 0.3 parts of anhydrous cobalt-(II) chloride and 4 parts of anhydrous magnesium sulfate and then maintained at 60°C. Then the mixture is added with 6 parts of 2,6-xylenol and stirred violently under the introduction of oxygen. After the absorption of oxygen is almost ended the introduction of oxygen is stopped and the reaction mixture is quickly filtered and the filtrate is added with previously prepared 10 parts of aqueous solution containing 0.2 parts of catechol and 0.5 parts of sodium sulfite and after a stirring allowed to stand. The same reaction and after-treatment is carried out without the addition of catechol and sodium sulfite and the reaction mixture is allowed to stand.

After left standing for 24 hours the intrinsic viscosity of the polymer obtained by the addition of catechol and sodium sulfite is 0.50 dl/g, whereas that of the polymer obtained without addition of these compounds is 0.45 dl/g.

What is claimed is:

1. In a process for the production of polyphenylene ethers by oxidative polycondensation phenols, represented by a formula

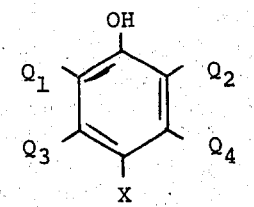

wherein X represents a substituent selected from the class consisting of hydrogen, chlorine, bromine and iodine atoms, $Q_1$ represents a monovalent substituents selected from the class consisting of hydrogen, alkyl, haloalkyl having at least two carbon atoms between the halogen atom and the phenyl nucleus, alkoxy and haloalkoxy having at least two carbon atoms between the halogen atom and the phenyl nucleus, $Q_2$, $Q_3$ and $Q_4$ are the same as $Q_1$ or halogen atom, provided that $Q_1$, $Q_2$, $Q_3$ and $Q_4$ are each free from a tertiary α-carbon atom, in the presence of a complex catalyst compound composed of a copper, manganese or cobalt salt as well as a primary, secondary or tertiary mono- or diamine as ligand, the method for producing polyphenylene ethers having any desired polymerization degree the improvement which comprises terminating the oxidative polycondensation-reaction by adding a reducing agent and simultaneously at least one member selected from the class consisting of dioxybenzenes and benzoquinones to the reaction medium at the stage of the desired polymerization degree, said dioxybenzenes being represented by the formula

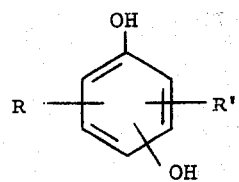

and said benzoquinones being represented by the formula

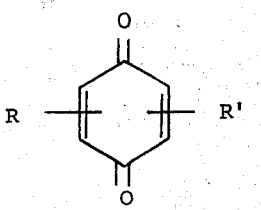

or by the formula

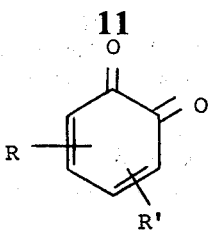

wherein R and R' represents each a hydrogen atom or a substituent selected from the class consisting of alkyl and alkoxy having at most 4 carbon atoms.

2. The process of claim 1, wherein said dioxybenzenes and/or benzoquinones are used in a molar amount of more than 2 times based on a mole of the oxidative polycondensation catalyst.

3. The process of claim 2, wherein the amount of said dioxybenzenes and/or benzoquinones is between 2.2 and 10 times based on a mole of the oxidative polycondensation catalyst.

4. The process of claim 2, wherein the dioxybenzenes are selected from the group consisting of hydroquinone catechol and nuclear-substituted derivatives thereof.

5. The process of claim 1, wherein said reducing agent is capable of giving electrons to a substance and does not reduce a metal compound contained in the oxidative polycondensation catalyst to a metal.

6. The process of claim 5, wherein said reducing agent is at least one member selected from the class consisting of sulfur suboxides, hydrogen sulfide, or salts thereof, salts of lower oxyacid, salts containing a metal in lower valency of higher oxyacid or hydroacid, hydroxylamine or derivatives thereof and hydrazine or derivatives thereof.

7. The process of claim 1, wherein said reducing agent is used in a molar amount more than three times based on a mole of the oxidative polycondensation catalyst.

8. The process of claim 7, wherein the amount of said reducing agent is between 3 and 10 times based on a mole of the oxidative polycondensation catalyst.

9. The process of claim 1, wherein polycondensation-reaction mixture is heated directly to distill out the solvent and then the concentrated solution is separated into polymer obtained and catalyst by an extraction or precipitation treatment.

* * * * *